United States Patent

Hoetzel et al.

[15] 3,694,635

[45] Sept. 26, 1972

[54] APPARATUS FOR DETERMINING AND RECORDING COMPONENTS AND DISTRIBUTIONS OF DIGITALLY OBTAINED MEASURED VALUES

[72] Inventors: Hubert Hoetzel; Kurt Tögel, Karlsruhe, Germany

[73] Assignee: Siemens Aktiengesellschaft, Berlin and Munich, Germany

[22] Filed: Oct. 2, 1970

[21] Appl. No.: 77,577

[30] Foreign Application Priority Data

Oct. 17, 1969    Germany..........P 19 52 283.9

[52] U.S. Cl. ..........235/151.3, 250/49.5, 235/151.35
[51] Int. Cl. ..........................G06g 7/12, H01j 37/26
[58] Field of Search..........235/151.3, 92 MT, 92 CA, 151.35, 235/151.32; 250/83.3, 49.5, 71.5

[56] References Cited

UNITED STATES PATENTS 3,479,506   11/1969   Dorfler.....................250/49.5
3,497,693   2/1970    Duftschmid et al. ......250/83.3
3,573,639   4/1971    Metz et al...........235/151.3 X Primary Examiner—Malcolm A. Morrison
Assistant Examiner—Edward J. Wise
Attorney—Edwin E. Greigg

[57] ABSTRACT

In the microanalysis of a sample face, the signals generated by X-rays reflected by said sample during scanning thereof by an electron beam, are applied to a counter, the output signals of which are applied to a comparator which is set to a desired limit range. Output signals pertaining to subsequent intervals and obtained from said comparator are applied to an additional comparator the output of which, in turn, is connected to a recording device or the like.

6 Claims, 10 Drawing Figures

APPARATUS FOR DETERMINING AND RECORDING COMPONENTS AND DISTRIBUTIONS OF DIGITALLY OBTAINED MEASURED VALUES

FIELD OF THE INVENTION

This invention relates to an apparatus for determining and recording the component and the distribution of digitally obtained measured values with statistic scattering which are delimited by threshold values and which pertain to a varying magnitude. Said apparatus preferably operates as an intensity discriminator in preparing signals for the purpose of plotting the distributions of concentration on the faces of a sample during electron beam microanalysis.

BACKGROUND OF THE INVENTION

Figure 1:
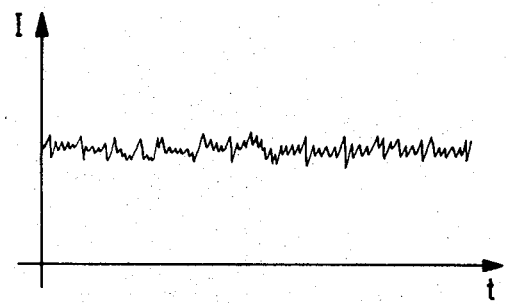
FIG. 1 illustrates a signal curve obtained with a known apparatus adjusted to a small time constant.

In an apparatus of the afore-outlined type, the measured values supplied digitally by a detector have to be applied to an integrating circuit. By way of example, the measured values may be a series of electric pulses, the pulse rate of which (i.e. pulses per time unit) characterizes the intensity of a physical magnitude. Even in case of magnitudes that are constant in time, the detector delivers a series of pulses to which a statistic scattering pertains. Consequently, at the output of the integrating circuit too, a signal appears which is a measure for the pulse rate and which, with respect to its true value, scatters statistically. This output signal is to be compared with the variably settable thresholds in a comparator. In this manner, an indication is obtained whether the pulse rate and thus the physical magnitude lies within or outside the range determined by the set limit values. The limit range indication is, for the purpose of plotting and further processing, applied to suitable output equipment or recording apparatus.

With the aid of such discriminator, the course of the limit range indications may be plotted as the magnitude varies in time and then the durations of the individual components which fall within the limit ranges under consideration and their distribution may be determined. Despite the statistic scattering, it has to be ensured by means of appropriate circuitry that no misrepresentations appear in the course of these limit range indications effected by the apparatus itself.

Apparatuses of the aforenoted type are known as intensity discriminators in the field of electron beam microanalysis. They serve for the determination of the component of various concentrations (phases) along or in the lines or planes on surfaces of heterogene solid bodies scanned with a known and uniform speed by an electron beam of an electron beam microanalyzer (microsonde).

An apparatus of the aforenoted type is discussed, for example, in an article by H. Christian and O. Schaaber, entitled "Erfahrungen mit der Intensitaetsdiskriminierung" that appeared in the periodical Michrochimica Acta, Supplement I, p. 119, 1966, published by Springer-Verlag. In the apparatus described therein, the pulses detected in the X-ray measuring channel of the microsonde are applied to a rate meter. The analog voltage signal appearing at the output of the rate meter is applied to a fully transistorized circuit in which the signal encounters two continuously adjustable thresholds. Only that signal of the rate meter is transmitted to an oscilloscope for plotting or to a recorder which lies under one threshold or above the other or between the two.

A further description of such an apparatus may be found in Austrian Pat. No. 279,943 issued Mar. 25, 1970. In the apparatus described therein, at the X-ray pulse counter a voltage discriminator selects a voltage range which particularly characterizes the phase to be analyzed. A usually blocked circuit is opened by an electronic switch component with the aid of the aforenoted voltage range for the period in which the electron beam is in the phase, the surface component of which is to be determined. The pulses of an oscillator operating with known and constant frequency and connected parallel to the aforenoted circuit component are transmitted thereby for the period the electron beam is in the phase to be measured. A counter counts the number of these pulses so that based on their number, the total dwelling period of the electron beam in the phase to be measured may be obtained. From this information, in turn, and from the known total scanning period T of the selected lines or planes, one may obtain the component of those phases to the voltages of which the discriminator is adjusted. These voltages are generated by a characteristic phase property.

Thus, known intensity discriminators always use a rate meter which is connected after the X-ray measuring channel. The analog output signal of the rate meter is then further processed. The analog signal discrimination and the use of rate meters have several disadvantages.

Figure 2:
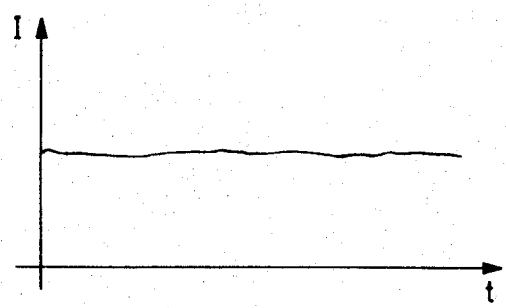
FIG. 2 illustrates a signal curve obtained with a known apparatus adjusted to a large time constant.

The momentary amplitude of an analog output signal of a rate meter is a function not only of the pulse rate but oscillates also as a function of the time constant to which the rate meter is set. FIGS. 1 and 2 illustrate the course of signals I as a function of time $t$ in case of a constant distribution of concentration on the sample. In FIG. 1, the statistic oscillations are shown in case of a small time constant, whereas FIG. 2 illustrates a case wherein the time constant is large.

Figure 3:
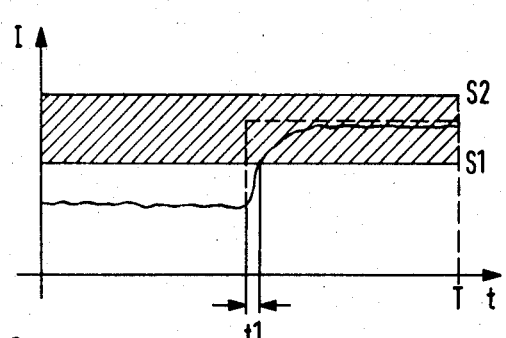
FIG. 3 illustrates, in a broken line, the course of actual X-ray intensity and in a continuous line, a characterizing signal curve obtained with a known apparatus adjusted to a large time constant.

If the time constant is selected to be large for the purpose of maintaining the oscillations of the output signals small at the rate meter, then during transmission of a concentration limit, a misrepresentation appears by the fact that the signal amplitude follows the actual X-ray intensity with a delay. This occurrence is illustrated in FIG. 3. The curve shown in broken line indicates the actual X-ray intensity of a distribution of concentration transmitted during the line scanning period T as a function of time $t$. During the period T the intensity jumps into the range (shown as the shaded area) limited by the lower threshold S1 and the upper threshold S2. The curve shown in solid line in FIG. 3 illustrates the output signal I of the rate meter. The threshold S1 is crossed by the output signal I with a delay of $t1$ and thus, the concentration limit is shown on the cathode ray tube with a delay of $t1$.

Figure 4:
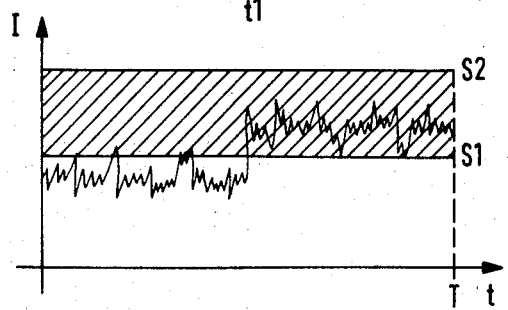
FIG. 4 is similar to FIG. 3, except that the characterizing curve is obtained with a known apparatus adjusted to a small time constant.

If the time constant is selected to be small, then the signal obtained from the rate meter has excessively large amplitude oscillations. This means, as illustrated in FIG. 4, that in case of a closely adjacent threshold, there is a continuous over- and undershooting of the set concentration limits, resulting in false indications on the cathode ray tube. If the thresholds S1 and S2 are, on the other hand, sufficiently spaced from one another, then small differences in concentration can no longer be distinguished.

Figure 5:
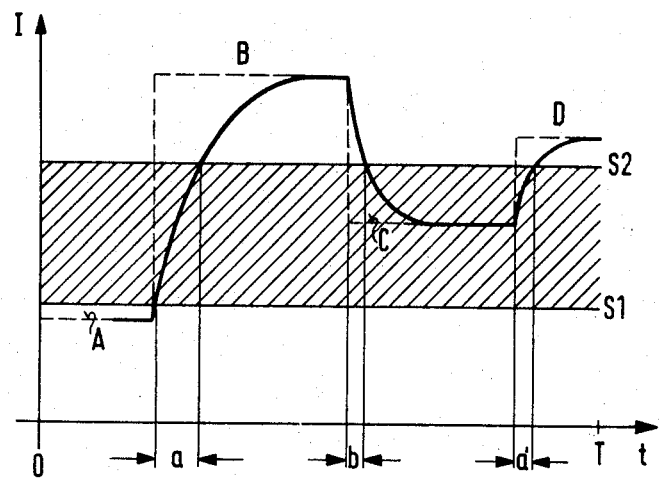
FIG. 5 illustrates, in a broken line, the course of actual X-ray intensity crossing several times a range to be examined and, in a continuous line, a characterizing signal curve obtained with a known apparatus.

In conventional measuring methods, even in case of small time constants there appears, as shown in FIG. 5, an erroneous signal at the edges of sample ranges of identical concentration (stages) as the signal amplitude jumps to a value above or below the limit range.

The curve shown in broken lines in FIG. 5 again indicates the X-ray intensity of a distribution of concentration during a line scanning period T, as a function of the time $t$. For example, there are four components A, B, C and D of constant intensity and thus of constant concentrations. Of these components only C falls in the range to be examined, which is delimited by the thresholds S1 and S2. The curve I shown in solid lines illustrates the analog output signal that appears at the rate meter. It is seen that during periods $a$ and $a'$ there is triggered and recorded a signal at the discriminator, although the sample range scanned during this period does not fall in the set concentration range. During the period $b$ no signal is recorded, although the concentration falls within the range to be examined.

The appearance of an erroneous signal in the period $a$ and $a'$ manifests itself in case of line scanning of the sample as brightened zones on the screen which misleadingly indicate the presence of concentrations in the range under examination. These zones increase with increasing time constants of the rate meter. The period $a$ and thus also the zone increase appreciably as the difference of intensity (B-A) increases. Consequently, the magnitude of the zones depends from the amplitudes A and B, that is, from the absolute concentrations at such stages.

OBJECT AND SUMMARY OF THE INVENTION

It is an object of the invention to eliminate the aforenoted shortcomings of analog pulse discrimination.

Briefly stated, according to the invention, the momentary digital measured value is applied to a counter during each periodically repeated time interval adjustable by a time signal generator. The output of the counter is connected through an intermediate memory means to the input of a comparator provided with digitally controllable limit value adjusters for setting two thresholds. Further, there are provided two additional memory means for storing in sequence the logic information obtained from the comparator during both the preceding and the successive intervals, a comparator connected to the last-mentioned two memory means for the AND-combination of the information stored therein, and an output equipment or recording device coupled to the output of the last-named comparator.

Thus, according to the invention, the digitally obtained signal (pulse sequence) is digitally processed up to recordation. Consequently, a rate meter is no longer required. The line scanning period T is divided into $n$ time intervals of the length $T/n$, whereby $n$ depends from the required resolution. The obtained pulses are counted in a counter and are compared with the two arbitrarily set, digitally adjustable limit values only at the end of each time interval. The indication whether the pulse rate lies within or outside the set range is stored and compared with the indication of the successive time interval. During the successive time interval, the indication for the previous interval is released for recording. The indication pertaining to the previous range is evaluated and subsequently recorded as a YES-indication only when the indications of the previous and successive intervals lie within the selected limit ranges.

Erroneous signals, such as those appearing in the analog signal processing as bright zones during the transmission of the selected thresholds, are eliminated from the apparatus according to the invention. The setting of the time intervals at the time signal generator is simple and possibilities of error by selecting an erroneous time constant are practically nil.

According to a further embodiment of the invention, means (for example, an electronic calculator) are provided for a program-controlled setting of the two digital thresholds. In this manner it is possible to examine fully automatically in succession (or simultaneously, if several discriminators are used) several limit value ranges. Programmers adapted for this purpose are disclosed, for example, in a leaflet issued by Siemens A.G. Berlin and Munich in September 1968 designated Eg 4/211 and entitled "Programmsteuerungen fur das Siemens-Sequenz-Röntgenspektrometer SRS" (Program Control for the Siemens Sequential X-Ray Spectrometer SRS), or in "Nucleonics", December 1964 (Vol. 22, issue No. 12), pages 48–52.

In a further development of the invention, two or more apparatuses of the afore-described type are arranged parallel to one another. By connecting parallel several discriminators after the measuring channel, several limit value ranges may be examined simultaneously.

According to still another development of the invention, the measured values obtained through several measuring channels are applied to counters, intermediate memory devices and comparators. These three different components are separate, but are controlled by a common time signal generator. The output terminals of the comparators are connected to a common coincidence circuit. In this manner, for example, several chemical elements may be simultaneously examined by microanalysis.

The invention will be better understood, as well as further objects and advantages will become more apparent, from the ensuing detailed specification of exemplary embodiments of the invention taken in conjunction with the drawing.

DESCRIPTION OF THE EMBODIMENT

Figure 9:
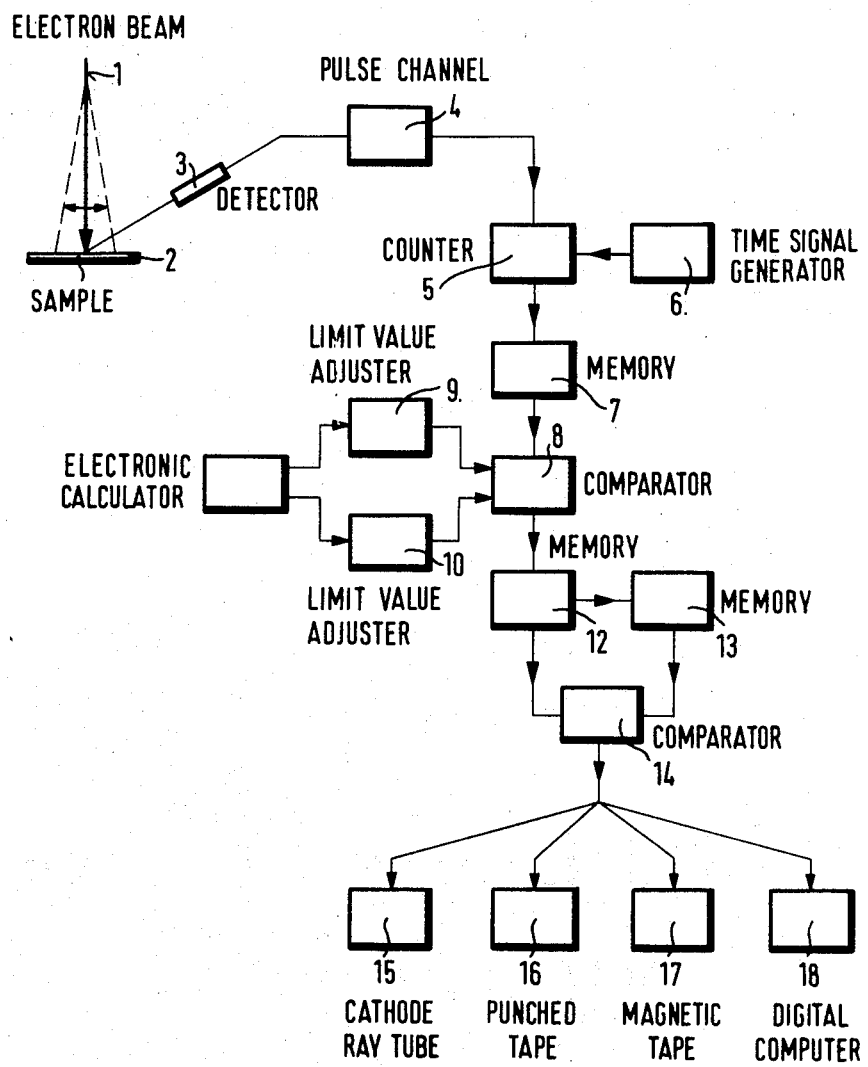
FIG. 9 is a block diagram of an apparatus according to the invention.

Turning first to FIG. 9, the electron beam 1 of a microsonde impinges on one point of the sample 2 which is scanned by line or in a grid-like manner. The intensity of the reflected X-ray beam is converted in the detector 3 into electric pulses which are amplified in the pulse channel 4. The time signal generator 6 divides the line scanning period T into adjustable time intervals and controls all the function groups of the pulse discriminator. At the end of each time interval, the time signal generator 6 interrupts the pulse counting process and shifts the pulse rate from counter 5 into the memory 7. The information on the counting obtained from the memory 7 is compared in the comparator 8 with the lower threshold S1 digitally set by the limit value adjuster 10 and with the upper threshold S2 digitally set by the limit value adjuster 9. If the pulse rate to be compared lies between the lower and the upper threshold, then in memory 12 there will be stored, for example, a logic One(L). Should this not be the case, then the memory 12 obtains a logic Zero (0).

At the end of the successive time interval, the information is transferred from the memory 12 to the memory 13 and the memory 12 is erased. In the meantime, according to the above-outlined pattern, the pulse number of the second measuring period has been compared and the corresponding logic value is stored in the memory 12. As a following step, the memory 13 is AND-compared with the memory 12 in the comparator 14. In case both values are "L", then an "L" is transmitted to the output or recording equipment for the sample range scanned during the preceding time interval. A cathode ray oscilloscope 15, a punched tape 16, a magnetic tape 17, a digital computer 18 or the like may be used as output or recording devices.

Figure 10:
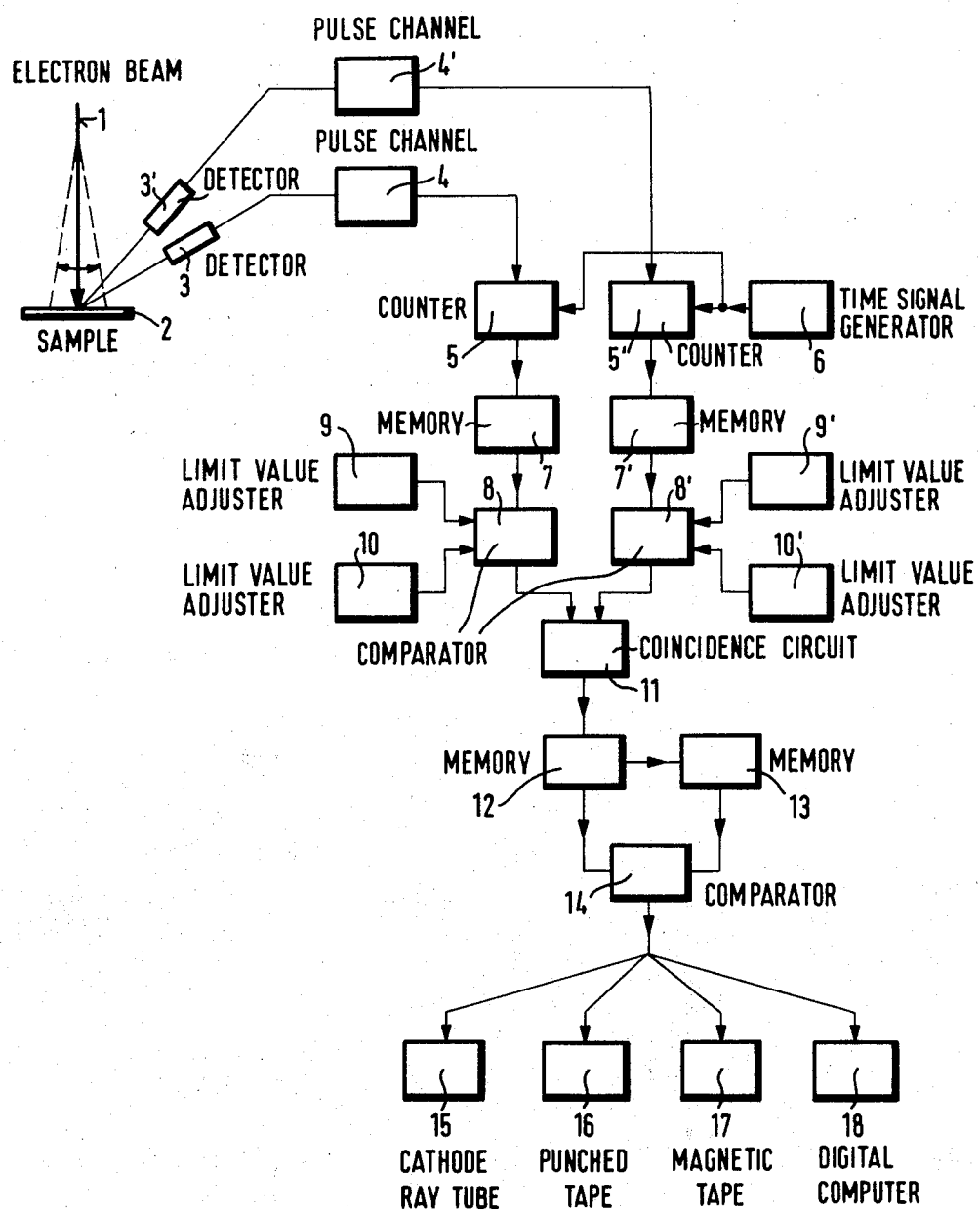
FIG. 10 is a block diagram of an apparatus similar to FIG. 9 and including additional circuit components.

Between comparator 8 and memory 12 there may be inserted a coincidence circuit 11 (FIG. 10). The latter transmits to the memory 12 a logic signal only if simultaneously it receives from the comparator 8 and additional comparators 8' positive limit range indications. The last-named additional comparators discriminate the electrical pulses transmitted by additional detectors 3'.

Figure 6:
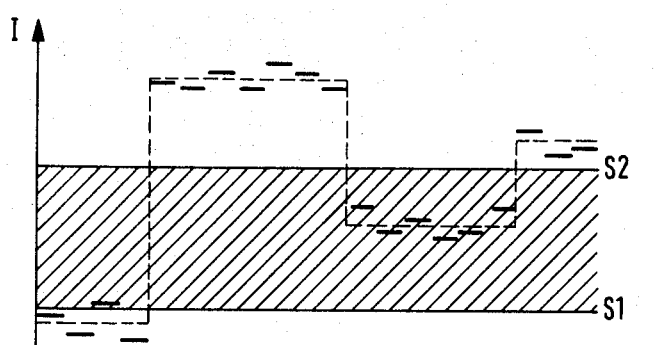
FIG. 6 illustrates the course of pulse rates emitted by a counter forming part of the apparatus according to the invention.

Turning now to FIG. 6, the square wave curve illustrated in broken lines is the X-ray intensity of the distribution of concentration during a line scanning period T, as a function of time $t$. The time signal generator 6 divides the line scanning period T into $n$ intervals. The pulse rates I recorded by the counter 5 during each time interval are indicated by horizontal dashes in FIG. 6. The individual pulse rates scatter statistically about the actual distribution of concentration. S1 and S2 designate the lower and upper thresholds of the limit value range.

Figure 7:
FIG. 7 illustrates, in relation to the graph of FIG. 6, the course of logic values emitted by a comparator forming part of the apparatus according to the invention.

FIG. 7 illustrates the logic indications effected by the comparator 8 for each pulse rate shown in FIG. 6. If the pulse rate of an interval lies within the limit value range between the two thresholds S1 and S2, then the comparator transmits, for example, an "L", or otherwise a "Zero" (0). In this manner, the intensity component C which, according to FIG. 6, lies between the two thresholds, is determined. Additionally, according to this example, from the values of the component A an "L" is obtained in the third time interval.

Figure 8:
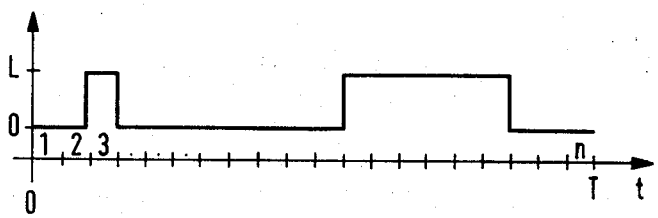
FIG. 8 illustrates, in relation to the graph of FIG. 7, the course of logic values emitted, subsequent to an AND-combination, by an additional comparator forming part of the apparatus according to the invention.

FIG. 8 shows the course of the logic indications from FIG. 7 for each time interval after the logic indication of the preceding interval has been compared in the comparator 14 with the successive interval. The "L" signal in the third interval obtained by statistic scattering has disappeared; the intensity component C is distinctly recorded.

It is noted that in the afore-described arrangement according to the invention, information pertaining to a time interval which borders either the right or the left boundary of concentration, will be lost. In order to ensure that this undefined area remains small, the time intervals have to subdivide closely the line scanning period T. This may be easily achieved and thus, the resulting errors remain far below those of the analog pulse rate discriminators.

The advantage achieved by the invention resides particularly in the fact that instead of an analog technique a digital technique may find application. According to the invention, erroneous indications which appear in the conventional technique, are eliminated.

That which is claimed is:

1. An apparatus for determining and recording the component and distribution of digitally obtained measured values with statistic scattering, falling between predetermined thresholds and characterizing a varying magnitude, comprising, A. a time signal generator for emitting signals characterizing periodically repetitive time intervals,
   B. a counter having an input receiving signals from said time signal generator and an input for receiving signals of digitally obtained measured values,
   C. a first memory having an input receiving signals from said counter,
   D. a first comparator having first, second and third inputs; said first input receiving signals from said intermediate memory,
   E. limit value adjusters connected to said second and third inputs of said first comparator to apply thereto two predetermined threshold values,
   F. a second and a third memory having inputs to receive, for successive storing, logic information obtained from an output of said first comparator during a preceding and a successive time interval,
   G. a second comparator having inputs receiving signals from said second and third memories for effecting an AND-combination thereof, and
   H. recording means receiving signals from an output of said second comparator.

2. An apparatus as defined in claim 1, wherein said limit value adjusters are digitally settable.

3. An apparatus as defined in claim 2, including means for a program-controlled setting of said limit value adjusters.

4. An apparatus as defined in claim 3, wherein said last-named means is an electronic calculator.

5. An apparatus as defined in claim 1, wherein at least two apparatuses are arranged parallel to one another.

6. An apparatus as defined in claim 1, including a plurality of sources delivering different measured values; a separate counter defined in (B), a separate first memory defined in (C), a separate first comparator defined in (D) and separate limit value adjusters defined in (E) associated with each said source; said separate counters, first memories, first comparators and limit value adjusters are controlled by a sole common time signal generator defined in (A) and a common sole coincidence circuit receiving signals from outputs of said separate counters, first memories and first comparators.

* * * * *